UNITED STATES PATENT OFFICE.

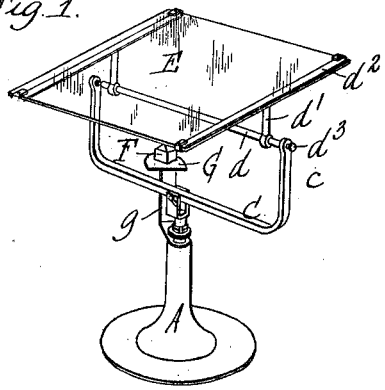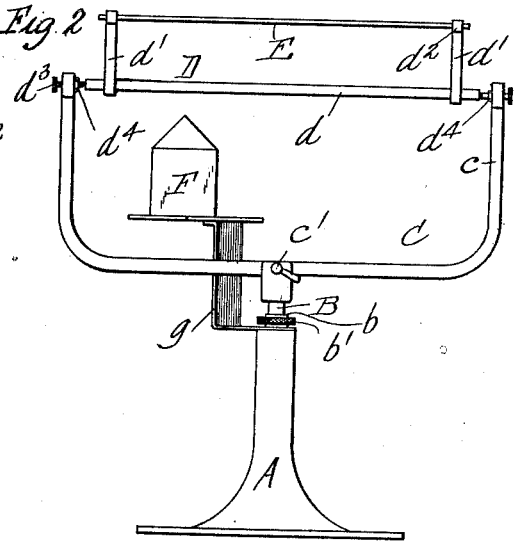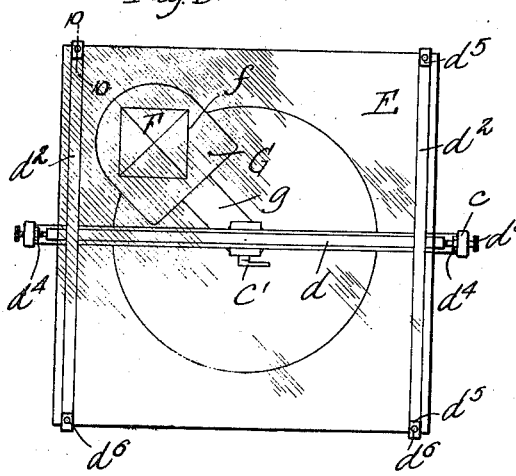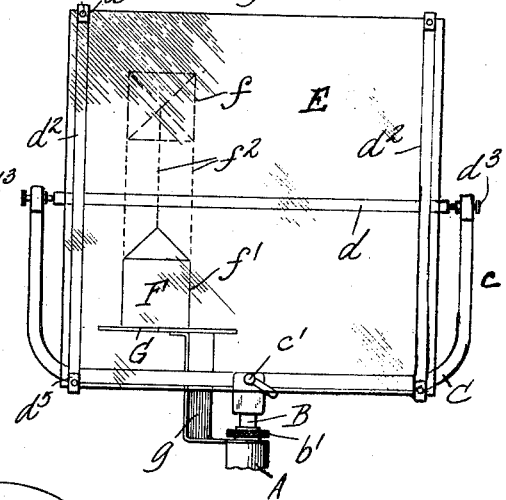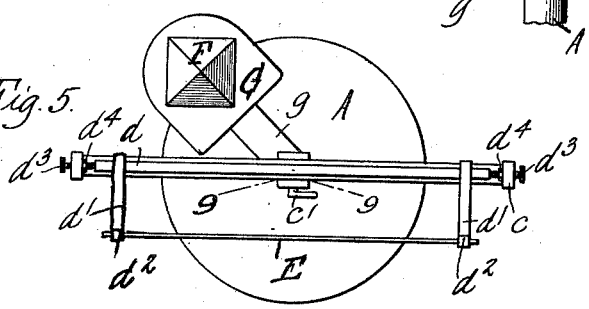

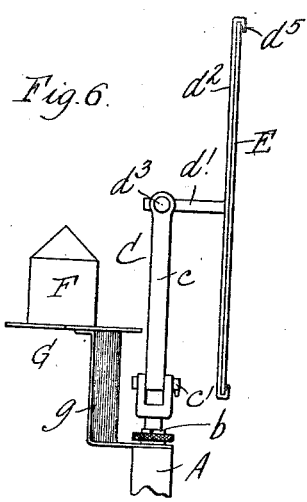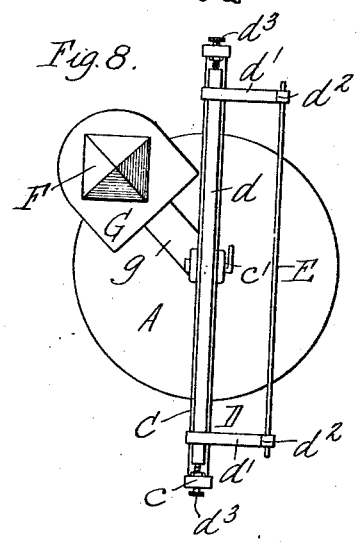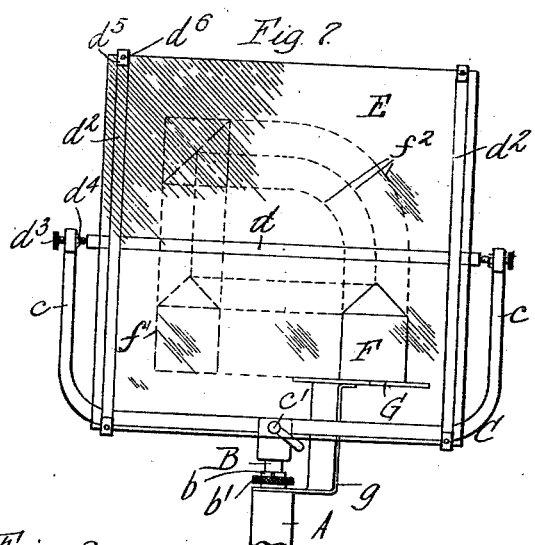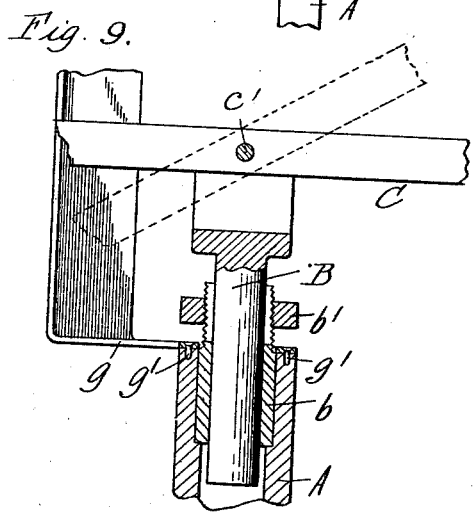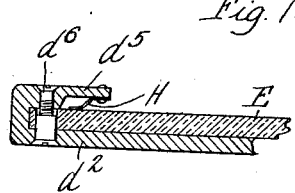

JAMES E. NELSON, OF LANCASTER, NEW YORK.

DRAFTING APPARATUS.

1,109,864.  Specification of Letters Patent.  Patented Sept. 8, 1914.

Application filed March 26, 1914. Serial No. 827,388.

*To all whom it may concern:*

Be it known that I, JAMES E. NELSON, a citizen of the United States, residing at Lancaster, in the county of Erie and State of New York, have invented a new and useful Improvement in Drafting Apparatus, of which the following is a specification.

This invention relates to drafting apparatus and more particularly to apparatus for teaching the principles of mechanical drawing.

The objects of the invention are to produce an apparatus of this kind by which the student can be readily made to understand how to correctly represent the various views or projections of an object and how they should be placed with relation to each other on the drawing, and which can also be used in teaching perspective drawing, and as a drawing board or table.

In the accompanying drawings, consisting of two sheets: Figure 1 is a perspective view of an apparatus embodying the invention. Figs. 2 and 3 are respectively a front elevation and a top plan view thereof. Fig. 4 is a front elevation thereof showing the transparent plate in a vertical position in front of the object. Fig. 5 is a plan view thereof, showing the parts in the same position as in Fig. 4. Fig. 6 is a front elevation thereof showing the transparent plate at the side of the object. Figs. 7 and 8 are respectively a side elevation and a top plan view thereof showing the parts in the positions shown in Fig. 6. Fig. 9 is a fragmentary sectional elevation on line 9—9, Fig. 5. Fig. 10 is a fragmentary sectional view of the transparent plate on line 10—10, Fig. 3.

Briefly stated, the apparatus comprises a suitable support or base and a glass or transparent plate which is pivotally mounted on the support or base so that it can be swung about a vertical axis and also about a horizontal axis to place it in different positions relative to a holder for the object or model to be drawn. By arranging the parts relatively to each other in this way, the transparent plate can be supported either horizontally over the object or vertically in front of or at the side thereof, or in any intermediate or inclined position so that the object can be seen through the plate and traced thereon in plan, or in different elevations or perspective.

The support or base A of the apparatus may be of any desired or suitable construction, either in the nature of a stand adapted to rest on the floor or of a part adapted for attachment to a table or other supporting device. In the construction shown, the support A is in the form of a pedestal adapted to rest on a floor and its upper part forms a hollow bearing in which is held an upright post B on the upper end of which a bracket C is mounted. This post is adjustably held by a bushing $b$ in the upper part of the pedestal. The post B is rotatably and vertically adjustable in the bushing $b$ and may be held in its adjusted position by any suitable means. For example, the upper part of the bushing is slotted, as shown in Fig. 9, and provided with a tapered thread on which a nut $b'$ screws to contract the slotted part of the bushing on the post and thus firmly clamp and hold the post stationary.

The bracket C consists of a substantially horizontal bar having upright end arms $c$ between the upper ends of which the transparent drawing plate E is pivotally supported to swing vertically, preferably by means of a supporting frame D. The bracket C is preferably pivoted in the slotted or bifurcated upper end of the post B by a screw $c'$ provided at one end with a handle whereby the screw can be tightened for clamping the bracket C in the bifurcated portion of the post to hold the same in any desired position.

The plate supporting frame D shown comprises a rod $d$ pivotally mounted on the upright ends of the bracket C and having arms $d'$ $d'$ connecting the rod $d$ with supporting bars $d^2$ on which the plate is secured. Any suitable means may be employed for pivotally mounting the plate supporting frame D on the bracket C and holding it in any desired position relatively to the bracket C. For instance, the ends of the rod $d$ are provided with conical sockets in which the conical ends of screws $d^3$ engage. These screws have a threaded engagement in the upper ends of the arms $c$ of the bracket C and, when screwed up tightly against the ends of the rod $d$, will clamp the frame D in any position in which it is set. When the screws $d^3$ engage the rod loosely, the frame D can be swung to different positions about the screws as a center. $d^4$ indicates lock nuts for holding the set screws in adjusted positions.

The supporting bars $d^2$ for the drawing plate E are preferably provided with bent-over ends $d^5$ adapted to embrace the edges of the plate, and screws $d^6$ $d^6$ extending through the ends of the supporting bars, serve to hold the glass plate firmly against movement relatively to the supporting members.

While the plate supporting frame D pivotally mounted on the bracket C as described is a desirable construction, the invention is not restricted to this construction and the transparent drawing plate could be mounted to swing vertically on a horizontally rotatable bracket or support in other ways.

It is desirable to provide in connection with a device of this kind, a suitable holder for the object or model to be drawn. In the construction shown, the object F is placed on a shelf or holder G having an arm $g$ secured on the base A. The arm shown has a part resting on the upper end of the pedestal of the base and is held against movement relatively thereto by pins $g'$ extending into sockets in the pedestal. The holder G may, however, be of any other suitable construction and can be supported in other ways.

In the use of this device for demonstrating the principles of mechanical drawing, the transparent plate E is moved into a horizontal position over the object, as indicated in Figs. 1, 2 and 3, whereupon a plan view of the object F can be seen by looking down through the plate. The plan view can then be readily traced on the plate as indicated at $f$. In order to explain the manner of representing the front elevation and its relation to the plan view, the plate E and frame D are swung on their horizontal axes into the position shown in Figs. 4 and 5. When the plate is in this position, the front elevation of the object can be seen through the plate and traced thereon as indicated at $f'$. By swinging the bracket C in the pedestal of the support A, the plate E can be swung to the side of the object and the side elevation traced thereon in a similar manner. It will be seen, by referring to Fig. 7, that the several views when drawn on the plate E will be in the proper relation with regard to each other providing the observer views the object in a direction perpendicular to the plate from the point thereof through which he sees the object. The various views can then be connected by projection lines $f^2$ if desired. The apparatus will firmly fix in the mind of the student the manner in which the views of an object should be represented on a drawing and also the relative position of any one view with regard to the other views. The plate E is universally adjustable relatively to the object and can be supported in any desired relation thereto so that perspective views of the object can be traced on the plate in the same manner as already described with reference to the plan and elevational views.

H H represent spring clips secured to the underside of the bent-over ends $d^5$ of the frame D and yieldingly pressing against the plate E. The clips are adapted to hold a sheet of paper on the plate E in case it is desired to use the apparatus as a drawing table.

I claim as my invention:

1. In an apparatus of the kind described, the combination with a holder for an object, of a transparent plate, means for supporting the plate to be rotatably adjusted horizontally and vertically to different positions relative to said object, and means for releasably holding the plate in adjusted position.

2. In an apparatus of the kind described, the combination with a holder for an object, of a transparent plate, a support on which said plate is mounted to swing to a position over said object or at a side thereof, and means for holding the plate in the position in which it is set.

3. In an apparatus of the kind described, the combination of a base, a transparent plate, and a bracket pivoted on the base to swing horizontally and to which said plate is pivoted to swing vertically.

4. In an apparatus of the kind described, the combination of a base, a transparent plate, and a bracket pivoted to swing in one plane relatively to said base, said plate being pivotally mounted on said bracket to swing in a plane substantially perpendicular to said first mentioned plane.

5. In an apparatus of the kind described, the combination of a base, a transparent plate, a bracket pivoted to swing in one plane relatively to said base, and a frame supporting said plate and pivotally supported on said bracket to swing in a plane substantially perpendicular to said first mentioned plane.

6. In an apparatus of the kind described, the combination of a base having a vertical bearing, a bracket pivoted in said bearing to swing horizontally, a frame pivoted on said bracket to swing in a substantially vertical plane, and a transparent plate supported by said frame.

7. In an apparatus of the kind described, the combination of a base having a vertical bearing, a bracket pivoted in said bearing to swing horizontally and having upwardly extending arms, a frame pivoted on said upwardly extending arms of the bracket, and a transparent plate supported by said frame.

8. In an apparatus of the kind described, the combination of a base, a transparent plate, a bracket pivoted on said base to swing in a substantially horizontal plane, and a frame supporting said transparent plate and comprising a substantially horizontal rod pivoted in said bracket, and arms extending outwardly from said rod and supporting said plate.

9. In an apparatus of the kind described, the combination of a base, a post pivoted to said base, a bracket pivoted to said post, a frame pivoted to said bracket, and a plate carried by said frame.

10. In an apparatus of the kind described, the combination of a base, a post pivoted to said base to swing in a horizontal plane, a bracket pivoted to said post to swing in a plane perpendicular thereto, a frame pivoted to said bracket and adapted to swing in a plane perpendicular to each of said other two planes, and a plate supported on said frame.

11. In an apparatus of the kind described, the combination of a base, a post pivoted to said base, a bracket pivoted to said post, a frame pivoted to said bracket, and a plate carried by said frame, said post being adjustable vertically in said base to regulate the height of said plate with regard to said base.

12. In an apparatus of the kind described, the combination with a base having an upright bearing portion, a bushing in said bearing portion of the base, a post held in said bushing and adjustable relatively thereto, a bracket pivoted on said post, and a plate pivotally mounted on said bracket.

13. In an apparatus of the kind described, the combination of a base, a holder for an object mounted on said base, of a transparent plate, means pivoted on said base for supporting said plate in different positions relatively to said holder, and means for holding the plate in an adjusted position.

14. In an apparatus of the kind described, the combination of a base, a holder for an object mounted on said base, of a transparent plate, a bracket pivotally mounted on said base and to which said plate is pivoted whereby the plate may be moved in different planes to different positions relatively to said object.

Witness my hand, this 21st day of March, 1914.

JAMES E. NELSON.

Witnesses:
C. W. PARKER,
A. L. McGEE.